Nov. 23, 1937. J. H. VAN UUM 2,100,017
SECURING DEVICE
Filed Aug. 2, 1932 2 Sheets—Sheet 1

INVENTOR
John H. Van Uum
BY Justin W. Macklin
ATTORNEY

Nov. 23, 1937.   J. H. VAN UUM   2,100,017
SECURING DEVICE
Filed Aug. 2, 1932   2 Sheets—Sheet 2

INVENTOR
John H. Van Uum,
BY Justin W. Macklin
ATTORNEY

Patented Nov. 23, 1937

2,100,017

UNITED STATES PATENT OFFICE

2,100,017

SECURING DEVICE

John H. Van Uum, Lakewood, Ohio

Application August 2, 1932, Serial No. 627,243

11 Claims. (Cl. 24—213)

The improved securing device comprising the present invention is primarily adapted for use in attaching fabric covered trim panels to the sheet metal framework of an automobile body, although the principles of the invention are applicable to other uses and the securing device may be employed for attaching separate parts of various structures, whatever their nature may be, together in superimposed relationship.

The principal object of the invention is to provide an improved device for quickly and accurately securing adjacent or overlying parts together in such a manner that the parts which are secured together will remain permanently in position with little or no tendency of these parts to become dislodged or separated.

Another object of the invention is to provide a spring fastener which is particularly well adapted for securing two or more layers of material together, one of which layers is comparatively rigid, as for example, being formed of metal.

More specifically, it is an object of the invention to provide a fastener that permits the application of a fabric or similar covering material, whether as a single layer or as a plurality of layers, to the body portion or foundation of a panel before the fastener itself is inserted through the opening provided for the same. By the provision of such a fastener, the application of the finishing material to the panel is greatly facilitated, inasmuch as the finishing material may be completely applied without the inconvenience of having protruding fasteners inserted into position on the panel before the application of the finishing material.

Furthermore by the present invention, the panels may be covered, stacked, piled or transported without the attendant danger of their becoming torn or otherwise marred because of the presence of protruding fasteners.

The present invention is designed as an improvement over the fastening device disclosed in my copending application, Serial No. 555,064, filed August 4, 1931, for Securing device and method. In this application there is disclosed a fastening device in the form of a spring clip reversed upon itself to provide a diamond-shaped head adapted to be forced into an opening formed in an automobile panel for holding the laminated trim material in position on the panel. The fastener disclosed in the above mentioned application is possessed of certain limitations one of which resides in the difficulty of forcing the clips through the openings into position. The openings provided in the metal panel are of round configuration, and the clip being flat in cross section, experiences considerable friction at its edges with the metal portion of the panel which surrounds the openings.

The present invention is designed to overcome this limitation and toward this end the invention contemplates the provision of a spring clip having a pair of ridges associated therewith, which ridges present upon insertion, a two point sliding contact with the metal surrounding the opening, and which at the same time serve to reinforce the clip and lend to the same an additional amount of ruggedness and durability.

The invention is susceptible to modification, and the improved clip comprising the present invention, in modified form, may be employed for attaching tubular objects to a flat sheet, as, for example, attaching battery, generator, lighting wire, and other cables to the framework of an automobile. Heretofore, in attaching such cables to the framework of an automobile the cable is engaged at spaced points along its length by a plurality of ring-like clips having attaching ears associated therewith, which ears are secured to the framework by means of bolts or the like. The installation of the cables by means of such devices is necessarily a tedious one, and the present invention contemplates the provision of a simple and effective clip which may be applied to the framework of an automobile before the application of the cable in such a manner that the cables may subsequently be applied in position on the framework by insertion beneath the clip and be retained thereon against dislodgement and against rattling. Furthermore, by use of the improved clips, the cables may be removed readily and new cables installed without removing the clips, thereby resulting in a saving in labor.

The invention in yet another form thereof contemplates the provision of a simple and effective clip for holding the edges of a panel trim in position, while at the same time the feature whereby the clip may be associated with the trim before the trim is applied is preserved.

The invention contemplates in an additional modification thereof an improved means for attaching a beading strip in position on the framework of an automobile, although in this regard the invention is susceptible to further modification and the clip may be employed for attaching moldings, beading strips, or the like, to any suitable supporting structure.

The invention is capable of still further modification in the form of an improved attaching clip for attaching separate parts of various structures together in superimposed relationship. By the improved clip, a fabric trim or the like may be attached to a supporting panel with the exposed portion of the clip presenting a smooth and attractive appearance. The clips may be associated with the trim before application of the trim and the trim later applied, and by the use of such clips the necessity of nailing the trim in position is eliminated, while at the same time the trim may be removed and replaced whenever desired with a minimum expenditure of labor.

Where the attachment of frame panels to sheet metal framework is concerned, the present clip, in addition to being an improvement over the clip shown in the above mentioned application, for the reason just outlined, is also an improvement in that means is provided for firmly clamping the clip to the panels in such a manner that after the clips are installed, a considerable amount of pressure is brought to bear on the various laminations forming the trim, to hold these laminations in position against subsequent dislodgement, such pressure being designed to be maintained permanently throughout the life of the panel.

A further object of the invention is to provide a method of attaching trim to a panel in which allowance is made for slight inaccuracies in drilling the panel and toward this end the invention contemplates the provision of a clip which is associated with the trim to be applied to the panel in such a manner that the clip may be aligned with the apertures in the panel without distorting the trim.

Yet another object of the invention is the provision of a fastening device in the form of a snap fastener which is extremely simple in its construction, one which may be inexpensively yet accurately formed from flat metal strip stock, that may be obtained at a very low cost.

In the accompanying drawings, one embodiment of the invention is disclosed in such a manner that it will enable an artisan to make, construct and assemble the constituent parts of the panel when these drawings are interpreted in the light of their accompanying specification.

In the above mentioned drawings.

In all of the above described views like characters of reference are employed to designate similar parts throughout.

Figure 3:
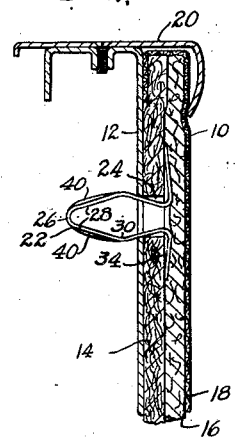
Fig. 3 is a view similar to Fig. 2 illustrating the manner in which the fasteners serve to secure the laminated trim material in position on the framework of an automobile.
Figure 4:
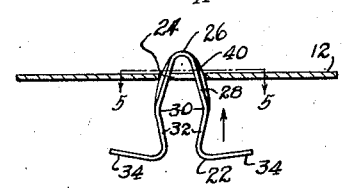
Fig. 4 is a side elevation of the clip comprising the present invention.

Referring now to Fig. 3, the reference numeral 10 designates in its entirety the upper longitudinal edge of a laminated trim structure adapted to be secured to the framework 12 of an automobile. The framework in this particular instance is in the form of a door panel. The panel 12 may form one side of a hollow sheet metal structure as is well known in this art. The trim 10 is shown as being comprised of an inner layer of cardboard 14, an intermediate layer of felt or similar material 16, and an outer layer of fabric 18. The upper molding of the window panel opening is shown at 20 and the trim material 10 extends beneath this molding as clearly shown at 20. The fasteners are shown at 22 and may be clearly seen in Fig. 4. In practice, the fasteners are incorporated with the panel before the panel and framework 12 are assembled together. The cardboard layer 14 of the trim is provided with a plurality of openings 24, through which openings one end of the fasteners is adapted to be received.

Figure 5:
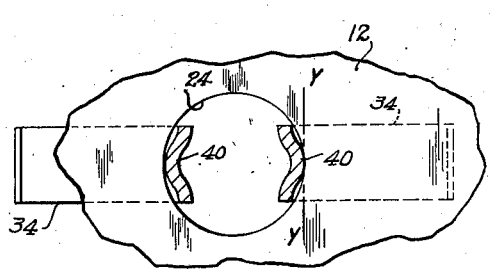
Fig. 5 is a sectional view taken substantially along the line 5—5 of Fig. 4.

Referring again to Fig. 4, which shows the improved fastener per se, this fastener comprises an elongated metal strip formed of suitable strip stock. The strip stock from which this fastener is formed is preferably .025" in thickness and is approximately ⅛" in width. The strip stock is cut to length and bent medially as at 26 to form a blunt rounded nose with outwardly diverging portions 28. The metal from which the fastener is formed is bent again inwardly at 30 to form converging portions 32. The bend at 30 is gradually rounded and the extremities of the strip are bent outwardly to provide laterally extending portions 34 which incline downwardly to a slight degree. The portions 34 of the fastener provide attachment ears or flanges which lie in planes that are slightly inclined with respect to each other at an angle of approximately 10 degrees. The clip is substantially symmetrical in form about the vertical axis designated at $x$—$x$. The blunt nose portions 26 are adapted to be forced into the openings 24 in the framework or panel 12, and in order to facilitate the operation of forcing the fasteners into these apertures, means is provided whereby a two-point contact is made with the metal surrounding the opening. Toward this end the diverging portions 28 are each provided with a longitudinal rib 40 formed by pressing the metal of the portions 28 outwardly. The radius of curvature of the ribs 40 is smaller than the radius of curvature of the openings 24, so that when the blunt nose portions of the fasteners are pressed through the openings, a line contact is made along the line y—y of each rib 40, as indicated in Fig. 5.

Figure 2:
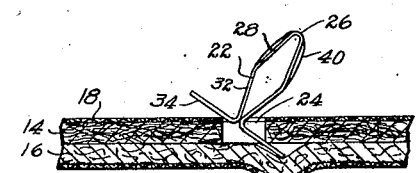
Fig. 2 is a sectional view showing one form of a laminated trim material and the method by which the fastener may be incorporated therewith.

As stated before, the fasteners are adapted to be associated with the trim material before this material is applied to the framework, and in order to apply each fastener to the trim, the fastener is inclined as shown in Fig. 2 with respect to the trim and one of the attachment flanges 34 is passed through the opening 24. In order to clear the other attachment flange which may then be passed through the opening, the first flange 34 is passed behind the layer of cardboard 14 and the fastener is bodily straightened so that the other attachment flange 34 may be moved behind this cardboard layer. During this application of the fastener to the trim material the fastener may be slightly compressed by moving the converging portions 32 and attachment flanges 34 toward each other to shorten the overall length of the attachment flanges. After the flanges have been inserted behind the cardboard layer 12 the fastener is allowed to expand and the overall length of the attachment flanges will be such as to preclude possibility of the fastener from becoming dislodged from the opening 24. The fastener thus applied is then permitted slight lateral movement with respect to the trim material, in order that the fastener may be aligned with any of the openings 24 that may have been improperly drilled.

After the fasteners 22 have been applied to the trim material in the manner just described, the trim material may then be applied to the framework with the fasteners thereon. The trim work is properly oriented with respect to the framework so that the fasteners 22 occupy positions substantially opposed to the respective openings 24 in the panel 12. The blunt nose portion 26—28 of the fasteners are then pressed through the openings 24. The diverging portions 28 of the fastener slide easily through these openings by virtue of the line contacts provided by the ribs 40. The fasteners ultimately snap into the position shown in Fig. 3.

Figure 1:
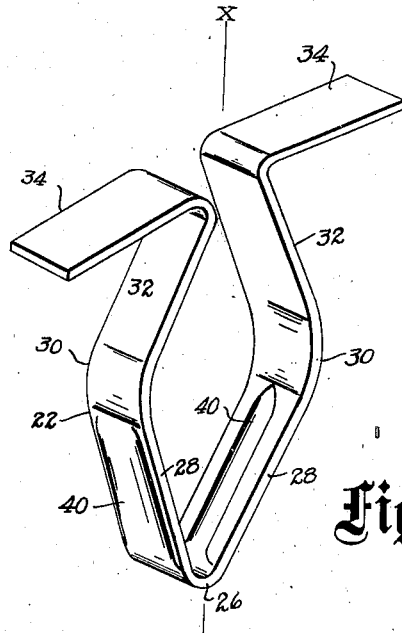
Fig. 1 is a perspective view of the improved fastening device comprising the present invention.

Inasmuch as the attachment flanges 34 do not occupy a common plane but are inclined outwardly slightly as regards the orientation of the fastener as shown in Fig. 1, the ends of these attachment flanges 34 serve to securely bind the fabric material against the panel 12 against subsequent dislodgement.

It is to be noted that the ribs 40 which are formed on the diverging portions 28 of the blunt nose 26 of the fastener serve not only to present a two-point contact with the sides of the openings 24, but also serve to lend additional rigidity to the fastener. The material from which the fastener is formed is preferably of spring material so that the fastener will inherently possess a degree of flexibility that will enable the attachment flanges 34 to be squeezed together, so to speak, and permit ready insertion of the fastener behind the cardboard portions 14 of the trimmed material 10.

The fasteners 22 are preferably rounded at the points where sharp corners would ordinarily occur. The corners of the attachment flanges, the bends 26 and 30, and the areas of juncture between the attachment flanges 34 and the converging portions 32 are gradually rounded while at the same time the entire surface of the fastener is preferably smoothened to facilitate assembly of the fasteners with the laminated structures and with the metal parts of the framework.

Figure 10:
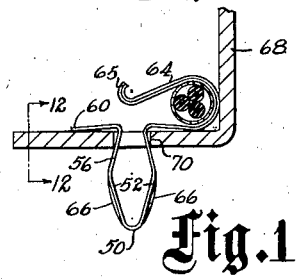
Fig. 10 is a fragmentary sectional view taken through a frame member of an automobile showing a modified form of clip secured in position for holding a battery cable in position within the framework.
Figure 12:
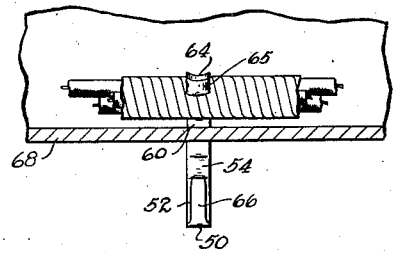
Fig. 12 is a sectional view taken substantially along the line 12—12 of Fig. 10.
Figure 11:
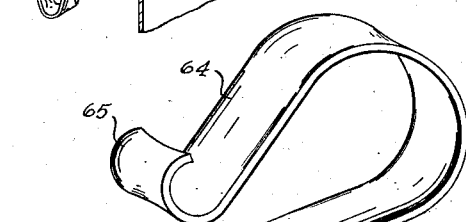
Fig. 11 is a perspective view of the clip shown in Fig. 10.

In Figs. 10, 11 and 12 a modified form of clip is shown, which clip may be employed for securing electrical wires as, for example, a battery, generator, lighting or other cable in position on the framework of an automobile. In this form of the invention the fastener comprises an elongated metal strip similar to the strip shown in Figs. 1 to 5, inclusive, and of substantially the same gauge. The strip stock is cut to length and bent as at 50 to form a blunt rounded nose with outwardly diverging portions 52. The metal is bent again inwardly as at 54 to form converging portions 56. The bend at 58 is gradually rounded and one extremity of the strip is bent outwardly to provide a laterally extending attachment portion 60 which inclines downwardly slightly. The other extremity of the strip is bent laterally as at 62 to provide a second attachment portion, and this end of the strip is bent to provide a retainer 64 which overlies the cable and holds the same in position. The extreme end of the strip is bent upwardly as at 65 to facilitate insertion of the cable within the retaining portion 64. The outwardly diverging portions 52 of the clip are similar to the portions 28 of the clip shown in Fig. 1 and are provided with ribs 66 similar to the ribs 40.

In Fig. 10 a frame member of the automobile is designated at 68. This frame member is provided with a plurality of apertures 70 extending therethrough and adapted to receive the improved attachment fastener.

In installing the cables, the clips are first applied to the apertures 70 in the frame. The blunt nose portions 50 of the clips are passed through the apertures by pressing these portions through the opening. As is the case in the form of the invention shown in Fig. 1, the ribs 66 will form a line contact with the edges of the apertures 70 to facilitate insertion of the clips. After the clips have been installed, they will be firmly held in position by virtue of the angle of inclination of the attachment portions 60—62, which are preferably inclined slightly with respect to each other at an angle of approximately 10 degrees. The attachment portions will accordingly bear against the frame 68 and hold the clip in position under tension, due to internal stress created within the clip. The cable or cables may then be slid underneath the rounded portion 65 and beneath the retaining portion 64 where they will be held securely in position against rattling by virtue of the pressure exerted upon the same by means of these portions 64. The manner in which the cable is retained in position is clearly shown in Fig. 12.

Figure 8:
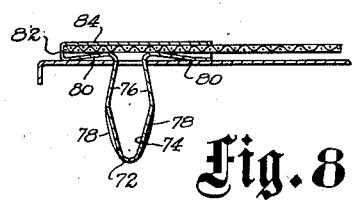
Fig. 8 is a sectional view similar to Fig. 7 showing yet another modified form of clip employed for securing the edges of a trim material in position on an automobile panel.

In Fig. 8 the clip is shown as being employed in such a manner as to accommodate the edges of the trim material which is to be attached to the trim panel. In this form of the invention the blunt nose portion 72, diverging portion 74, and converging portion 76, ribs 78, and the lateral attachment portions 80 remain substantially the same as in the other forms of the invention. One of the attachment portions 80 is bent upwardly as at 82 and laterally as at 84 to provide an overlying, retaining finger adapted to receive therebeneath the longitudinal edges of a sheet of the trim material. The clip is applied to the metal trim panel in the manner previously described, and as is the case with the other forms of the invention, clips of this nature are capable of association with the trim material before the material is applied to the panel. The fingers 84 may also be employed as retaining elements for securing cards or the like in position. Irrespective, however, of these details of use, the essential features of the invention are at all times preserved.

Figure 9:
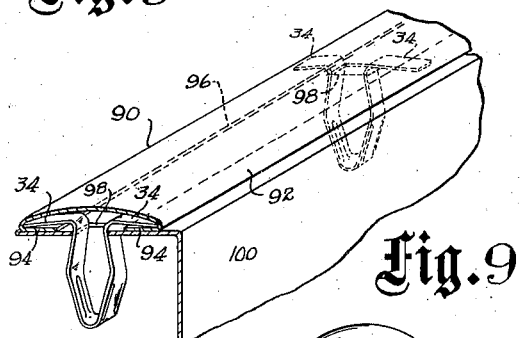
Fig. 9 is a fragmentary perspective view of the improved clip showing the same employed for the purpose of attaching a beading strip in position on a supporting structure.

In Fig. 9 the improved clip shown in Figs. 1–5, inclusive is shown as being employed for attaching a molding or beading strip 90 in position. The strip shown comprises an overlying portion 92 having its longitudinal edges bent inwardly as at 94 and terminating a slight distance from each other to provide an elongated slot 96 on the underneath side of the strip. The attachment portions 34 may be inserted in the slot 96 either by turning these attachment portions so that they may be inserted into the slot or by pressing the metal of the clip in such a manner that these attachment portions may be inserted in the slot without turning of the clip. The clips are aligned in the slot before attachment of the strip in position, so that they will directly oppose a number of rectangular apertures 98 which are provided in the supporting structure 100 to which the strip is to be applied. The strip may then be applied by pressing the blunt nose portions of the clip through their respective apertures. By the provision of rectangular apertures in the metal framework, turning of the clips is prevented and the attachment flanges of the clip will at all times lie transversely of the slot 96.

Figure 6:
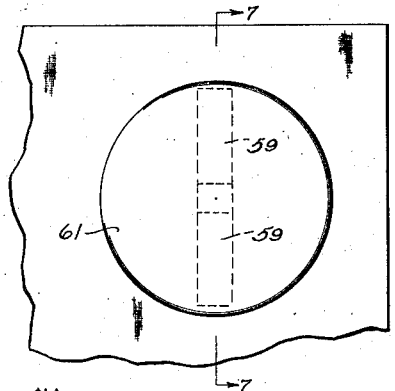
Fig. 6 is a fragmentary plan view of a modified form of attaching clip showing the same applied to the trim panel of an automobile.
Figure 7:
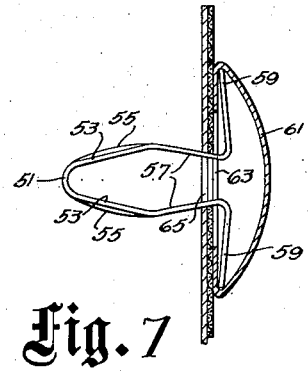
Fig. 7 is a sectional view taken substantially along the line 7—7 of Fig. 6.

In Figs. 6 and 7 yet another modification of the clip is shown. In this form of the invention the clip is provided with a blunt nose portion 51, diverging portions 53 having ribs 55 associated therewith, converging portions 57 and attachment portions 59, all of which parts are similar in every respect to the corresponding parts shown in Fig. 1. Designated at 61 is a hollow shell-like head having a uniformly smooth surface and having an aperture 63 formed in the underneath side thereof. The attachment portions 59 are adapted to be brought together as previously described, to permit their insertion into the aperture 63. The clip is shown as serving to hold a trim material on a trim panel and when the clip is installed in position the blunt nose portion is pressed through an aperture 65 in the trim panel by simply exerting pressure on the head 61. The edges of the aperture 65 ride upon the ribs 55 in a line contact and permit the clip to be snapped into position.

Figures 14, 15:
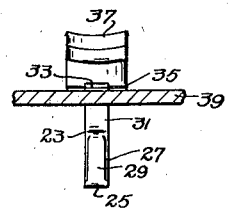
Fig. 14 is a side elevation of the clip formed from the blank shown in Fig. 13, showing the same applied to a suitable framework.
Fig. 15 is a sectional view taken substantially along the line 15—15 of Fig. 14.
Figure 13:
Fig. 13 is a plan view of a blank from which another modified form of the clip may be formed.

A modified form of cable holding clamp is shown in Figs. 14 and 15. The clamp shown in these two figures is formed from the blank shown in Fig. 13. In the manufacture of automobile frame structures, structural members, bars, beams and the like, manufacturing specifications will not permit the formation of apertures in these members which exceed $\frac{3}{32}$ of an inch in diameter, or, in the case of non-circular apertures, which exceed this dimension at the greatest width across the aperture. Because of this limitation set upon the size of aperture that may be employed, a limitation is imposed upon the dimensions and consequent strength and rigidity of the clip which may be employed in the aperture. The clip shown in Figs. 14 and 15 is designed to afford maximum strength and rigidity with respect to the maximum size aperture that may be employed and yet fall within the requirements set forth by engineering specifications. The clip shown in Figs. 14 and 15 is somewhat similar to the clip shown in Fig. 11. This clip is designated at 23. The clip is formed from a single strip of material shown in Fig. 13 and is provided with a blunt nose portion 25, diverging portions 27 having ribs 29 associated therewith, converging portions 31, attachment portions 33 and 35, and a retaining portion 37 similar to the retaining portion 64 in Fig. 11. The blunt nose portion 25, diverging portions 27, and converging portions 31 are formed of material that will just fit within the maximum size aperture that may be employed in the structural member 39. It is calculated that the proper width of this material is $\frac{3}{16}$". When the material is formed of this width, the edges of the same bear against the edges of the aperture with the proper relationship for maximum strength and rigidity of the clip. The material which forms the retaining portion 37 is approximately ½" in width, in order that a relatively large bearing surface may be obtained upon the cables which are to be secured in position.

The invention is not to be limited to the exact arrangement of the parts shown in the accompanying drawings or described in this specification, as various changes in the details of manufacture may be resorted to without departing from the spirit of the invention. The invention is to be limited only insofar as it has been pointed out in the accompanying claims.

I claim:

1. A spring fastener comprising a single integral elongated piece of sheet metal spring strip stock bent to form an enlarged diamond shaped head for insertion into a suitable opening formed in one of two parts to be fastened together in overlying relationship, the forward sides of said diamond shaped head being provided with longitudinal ribs, the ends of the stock projecting oppositely in planes that are inclined toward the enlarged head at an obtuse angle with respect to each other, whereby when the enlarged head is inserted in an opening in one of said parts said ends urge the other part against the former part.

2. A spring fastener comprising a single integral elongated piece of sheet metal spring strip stock bent to form an enlarged diamond shaped head for insertion into a suitable opening formed in one of two parts to be fastened together in overlying relationship, the forward sides of said diamond shaped head being provided with longitudinal ribs, the ends of the stock projecting oppositely in planes that are inclined toward the enlarged head at an angle of approximately 10°, and said diamond-shaped head being connected to said projecting ends, permitting lateral movement of said ends relative to said head portion.

3. A metal fastener comprising an elongated strip of resilient material bent intermediate its ends to form a relatively blunt point and having other bends intermediate the blunt point and the ends of the strip forming a substantially diamond shaped head adapted to be forced through an opening formed in a support, the rearward sides of the diamond shaped head being adapted to be resiliently urged into engagement with portions of the support adjacent the periphery of the opening therein, portions of the strip intermediate the rearward portions of the diamond shaped head and the ends of the strip being angularly disposed relative to the rearward portions of the diamond shaped head so as to be inclined outwardly and towards the blunt point when the fastener is in position in said opening, whereby portions of said strip spaced from the diamond shaped head press against the support and urge the rearward portions of the diamond shaped head into engagement with the support.

4. A metal fastener comprising an elongated strip of resilient material bent intermediate its ends to form a relatively blunt point and having other bends intermediate the blunt point and the ends of the strip forming a substantially diamond shaped head adapted to be forced through an opening formed in a support, the forward sides of the diamond shaped head being provided with longitudinal ribs, having their outer faces laterally convex, the rearward sides of the diamond shaped head being adapted to be resiliently urged into engagement with portions of the support adjacent the periphery of the opening therein, portions of the strip intermediate the rearward portions of the diamond shaped head and the ends of the strip being angularly disposed relative to the rearward portions of the diamond shaped head so as to be inclined outwardly and towards the blunt point when the fastener is in position in said opening, whereby portions of said strip spaced from the diamond shaped head press against the support and urge the rearward portions of the diamond shaped head into engagement with the support.

5. A spring fastener for overlying parts having complementary openings comprising a single flat unitary piece of elongated spring strip stock bent substantially centrally of its ends and providing an enlarged head having a blunt nose portion, oppositely directed attaching flanges at the extremities of the stock, portions diverging from said blunt nose portion and provided with longitudinally extending ribs shaped to present a substantially single line contact with the sides of an opening in which the fastener is adapted to be received, and converging portions leading from said diverging portions to said oppositely directed flanges.

6. A spring fastener for overlying parts having complementary openings comprising a single integral piece of elongated spring strip stock bent intermediate its end portions to provide side portions diverging from a nose portion, end portions of the stock being bent laterally to provide oppositely directed attaching flanges, the diverging side portions of said blunt nose portion being formed with longitudinal ribs which are laterally convex and extend outwardly from the side portions, and converging sides connecting said diverging portions to said oppositely directed flanges.

7. A metal fastener comprising a unitary integral strip of spring metal bent substantially centrally of its ends to form a blunt point and having bends between said point and its extremities forming a substantially diamond-shaped head adapted to be forced into an opening formed in one member of two or more parts to be fastened together in overlying relationship, said bends urging outwardly when in contact with said parts having overlying relationship, and the forward sides of said diamond shaped head being provided with longitudinal ribs having a transverse curvature on a smaller radius than that of the said opening.

8. A metal fastener comprising a unitary integral strip of spring metal bent substantially centrally of its ends to form a blunt point and having bends between said point and its extremities forming a substantially diamond-shaped head adapted to be forced into an opening formed in one member for securing two or more parts to be fastened together in overlying relationship, the forward sides of said diamond-shaped head being provided with longitudinal ribs upstruck from the metal of the forward sides.

9. A metal fastener for securing a member to a support having a circular aperture and comprising a single strip of spring metal having portions arranged for connection to the member and portions convergent flatwise in a direction away from the first mentioned portion and arranged for reception endwise through an aperture in the support, and each of said convergent portions having a rounded rib extending longitudinally thereof, and the radius of curvature of each rib being substantially less than the radius of curvature of the walls defining the aperture.

10. A metal fastener for securing together a plurality of members having aligned openings and comprising a single strip of spring metal having a portion between its ends in the form of a nose and side portions extending therefrom and spaced apart from each other, and having elongated portions beyond the side portions in a direction away from the nose and in the form of oppositely extending flanges inclined outwardly laterally of the fastener in a direction toward the nose, said side portions having shoulder portions spaced from the flanges in a direction toward the nose for engagement with one of the members when the clip is installed in the openings and which cooperate with the flanges for securing the members together.

11. A metal fastener for securing a member to an apertured support and comprising a single strip of spring metal having a portion between its ends in the form of a blunt nose and side portions extending therefrom and divergent therefrom partway of their length and convergent therefrom partway the remainder of their length, and in the form of a generally diamond-shaped head, and having its free end portions in the form of flanges extending in opposite directions laterally of the fastener and inclined outwardly and toward the nose when the clip is installed.

JOHN H. VAN UUM.